United States Patent
Horita et al.

(10) Patent No.: US 7,286,449 B2
(45) Date of Patent: Oct. 23, 2007

(54) OPTICAL PICKUP DEVICE

(75) Inventors: Masami Horita, Tokyo (JP); Masanori Tei, Tokyo (JP)

(73) Assignee: Teac Corporation, Tokyo (JP)

( * ) Notice: Subject to any disclaimer, the term of this patent is extended or adjusted under 35 U.S.C. 154(b) by 617 days.

(21) Appl. No.: 10/811,233

(22) Filed: Mar. 26, 2004

(65) Prior Publication Data

US 2004/0223444 A1   Nov. 11, 2004

(30) Foreign Application Priority Data

Mar. 28, 2003   (JP) ............................. 2003-090172

(51) Int. Cl.
*G11B 7/00* (2006.01)

(52) U.S. Cl. ................................. 369/44.14

(58) Field of Classification Search ...................... None
See application file for complete search history.

(56) References Cited

U.S. PATENT DOCUMENTS

| | | | | |
|---|---|---|---|---|
| 5,555,228 A | * | 9/1996 | Izuka | 369/44.15 |
| 5,555,232 A | * | 9/1996 | Kobayashi et al. | 369/112.17 |
| 6,356,398 B1 | * | 3/2002 | Otsuki et al. | 359/739 |
| 6,819,491 B2 | * | 11/2004 | Takahashi et al. | 359/566 |
| 7,082,084 B2 | * | 7/2006 | Kabasawa | 369/44.16 |
| 2001/0021164 A1 | * | 9/2001 | Fujii et al. | 369/215 |

FOREIGN PATENT DOCUMENTS

| | | |
|---|---|---|
| JP | 09-007204 | 1/1997 |
| JP | 2003-109234 | 4/2003 |
| WO | WO 02103430 A1 * | 12/2002 |

* cited by examiner

*Primary Examiner*—William Korzuch
*Assistant Examiner*—Christopher R Lamb
(74) *Attorney, Agent, or Firm*—Weingarten, Schurgin, Gagnebin & Lebovici LLP (57) ABSTRACT

An object of the present invention is to provide an optical pickup device with high reliability and reduced thickness, which can form an accurate beam spot without providing a thin film section in a lens holder and without influence of peripheral light of laser beam. There is provided an optical pickup device for driving and controlling a lens holder 1 holding an objective lens 4 by using a moving coil method, and adjusting an irradiation position of laser beam on an optical disk by displacing the objective lens 4, wherein a cut-out portion 1*d* is formed at a position closest to a rising mirror 10 on an opening 1*a* which is formed in the lens holder 1 for holding the objective lens 4, and a light-shielding ring R for sealing the cut-out portion 1*d* is arranged to fix the objective lens 4.

1 Claim, 8 Drawing Sheets

OPTICAL PICKUP DEVICE

This application claims priority to a Japanese application No. 2003-090172 filed Mar. 28, 2003.

BACKGROUND OF THE INVENTION

1. Field of the Invention

The present invention relates to an improvement of an optical pickup device of a disk apparatus for driving optical disks (for example, a CD-R/RW, a DVD-R/-RW/RAM/+R/+RW, etc.), which is recording media for recording a large amount of data used in various computer systems.

2. Description of the Related Art

In general, in order to record data on optical disks or to reproduce data from the optical disks, disk apparatuses for driving the optical disks are indispensable for personal computers (hereinafter, referred to as PCs), so that the disk apparatuses should be built into the main bodies of PCs or externally connected to the PCs through cables.

Recently, in the disk apparatuses to be produced for the above purpose, enhancement of accuracy and reliability has been required, including an increase of a recording density and an increase of readout speed, writing speed, etc. Furthermore, since reduced thickness has been intensively required for notebook PCs, each component have been improved to contribute to the reduced thickness of the disk apparatuses.

Figure 4:
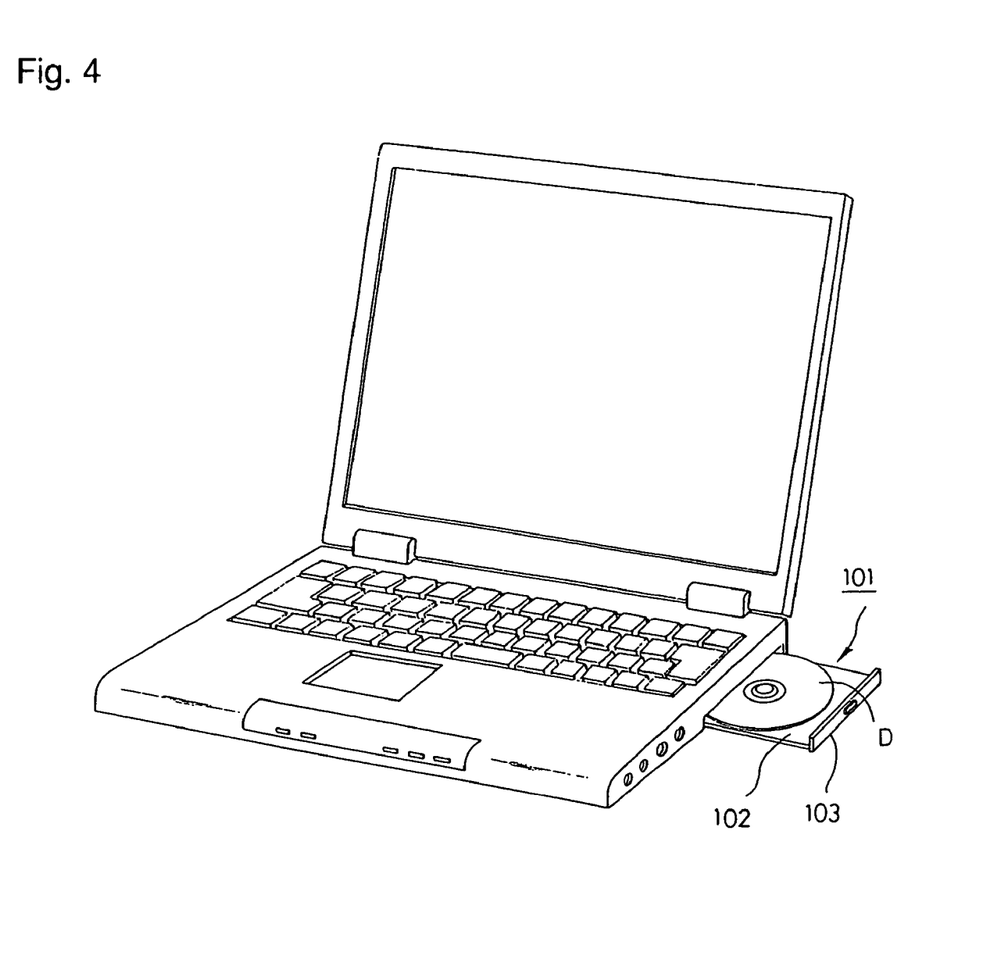
FIG. 4 is a perspective view illustrating an appearance of a notebook PC.

FIG. 4 shows an appearance of a notebook PC having a built-in disk apparatus. Here, a disk apparatus 101 is usually built into a side portion of the main body of PC, a bezel 103 of a disk tray 102 is popped out by means of manipulation of a switch or instructions from the main body of PC, and the user of the PC ejects the disk tray 102 to load an optical disk D therein.

Figure 5:
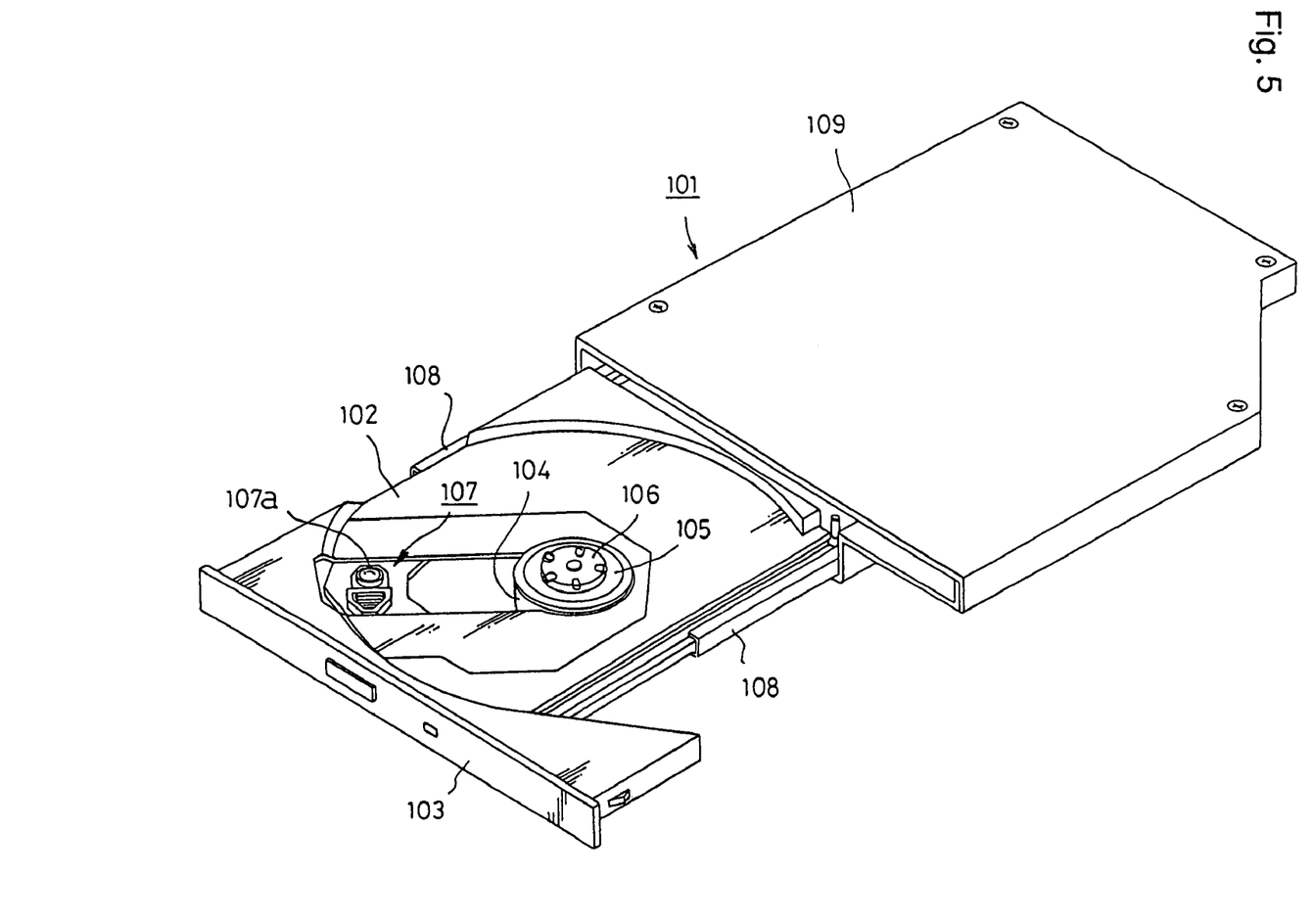
FIG. 5 is a perspective view illustrating an appearance of a disk apparatus.

FIG. 5 shows an appearance of a conventional disk apparatus 101. Here, the disk tray 102 has a plate shape for receiving the optical disk D, and the center thereof is provided with a turn table 105 fixed to a driving shaft of a spindle motor 104 provided immediately therebelow. A central hole of the optical disk is clamped by a clamp head 106 of the turntable 105, thereby transferring a rotary power to the optical disk.

Reference numeral 107 denotes a head unit. Here, the entire head unit is reciprocated in a diametrical direction of the disk tray 102 by means of a driving mechanism provided at the other surface of the disk tray 102, and a laser beam is applied from an objective lens 107a to the optical disk. On both sides of the disk tray 102 thus constructed are loosely fitted by guide rails 108, and the guide rails 108 are supported by support rails fixed to a chassis case 109 to slide thereon. Accordingly, the disk tray 102 is moved forwardly and backwardly in the chassis case 109, thereby enabling the loading and the unloading of the optical disk.

Figure 6:
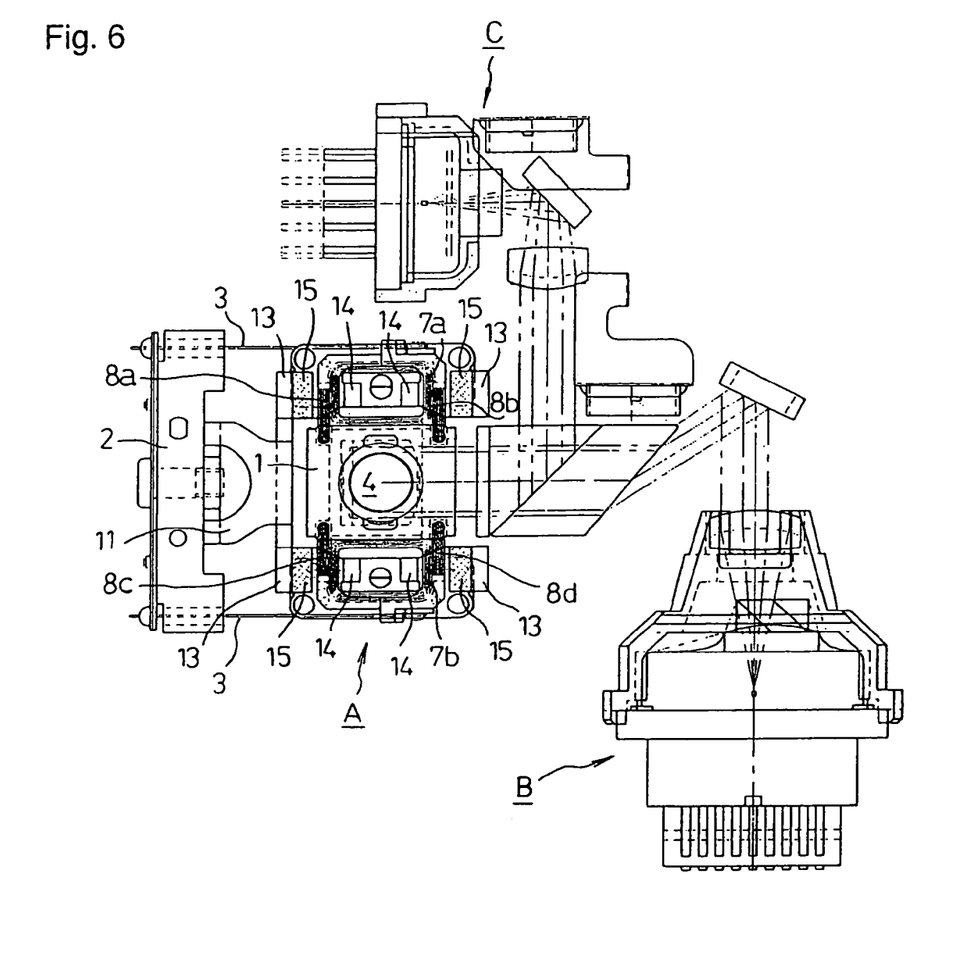
FIG. 6 is a plan view schematically illustrating the configuration of an optical pickup device.

An example of the configuration of an optical pickup of the head unit in the disk apparatus thus constructed is shown in FIG. 6. In the figure, an optical pickup device A, a DVD semiconductor laser device B, and a CD semiconductor laser device C are arranged, and a optical path is formed such that light beams emitted from the respective laser devices can reach the objective lens 4 of the optical pickup device A via optical components, such as a plurality of mirror systems and lens systems.

Figure 7:
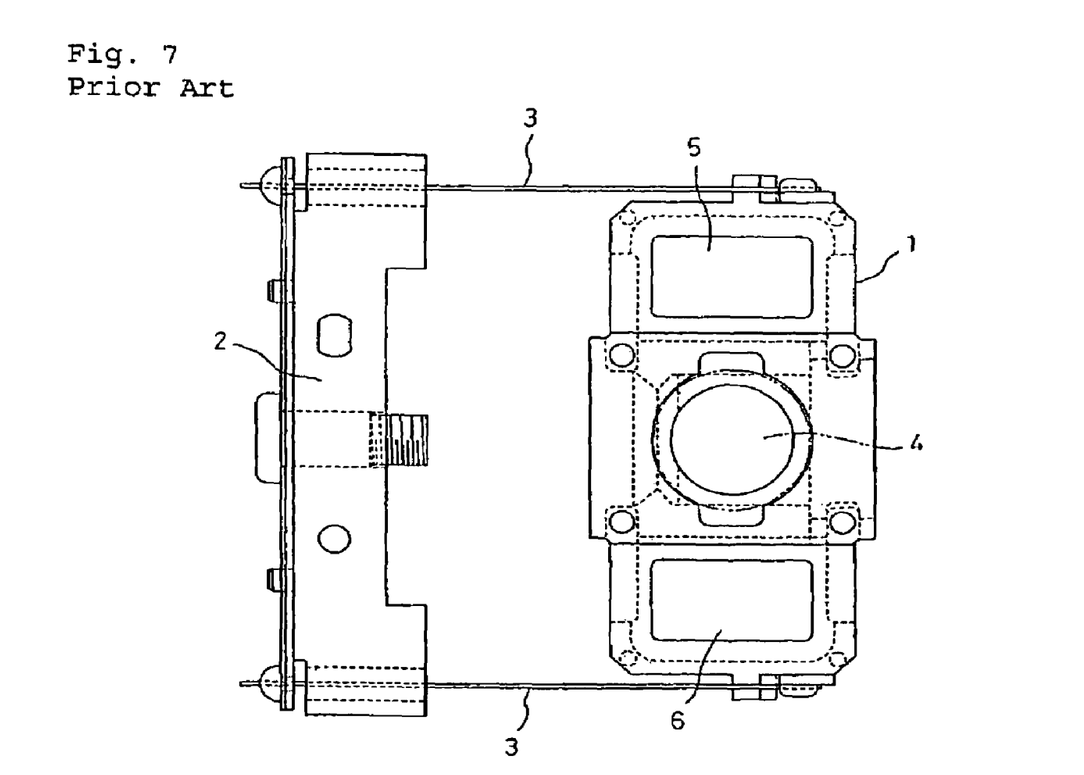
FIG. 7 is a plan view illustrating the configuration of a conventional lens holder.

In the optical pickup device A, as shown in FIG. 7, a lens holder 1 is fixed to a suspension holder 2 through suspension wires 3 in a cantilevered manner. The lens holder 1 holds the objective lens 4 at the center thereof, and coil-receiving sections 5 and 6 are formed in a vertical symmetry on the objective lens 4. The coil-receiving sections 5 and 6 receive focus coils 7a and 7b and tracking coils 8a, 8b, 8c and 8d. The focus coils 7a and 7b and the tracking coils 8a, 8b, 8c and 8d are fixed with an adhesive, and the coils are fixed to the inside of the coil receiving sections 5 and 6 with an adhesive.

A yoke base 11 for fixing the suspension holder 2 at one end thereof is provided at the other end with raised yoke pieces 13 and 14, and permanent magnets are fixed to the yoke pieces 13. As a result, magnetic circuits are constructed between the permanent magnets 15 and the yoke pieces 14, and the focus coils 7a and 7b and the tracking coils 8a, 8b, 8c and 8d are arranged in the magnetic circuits.

Figure 8:
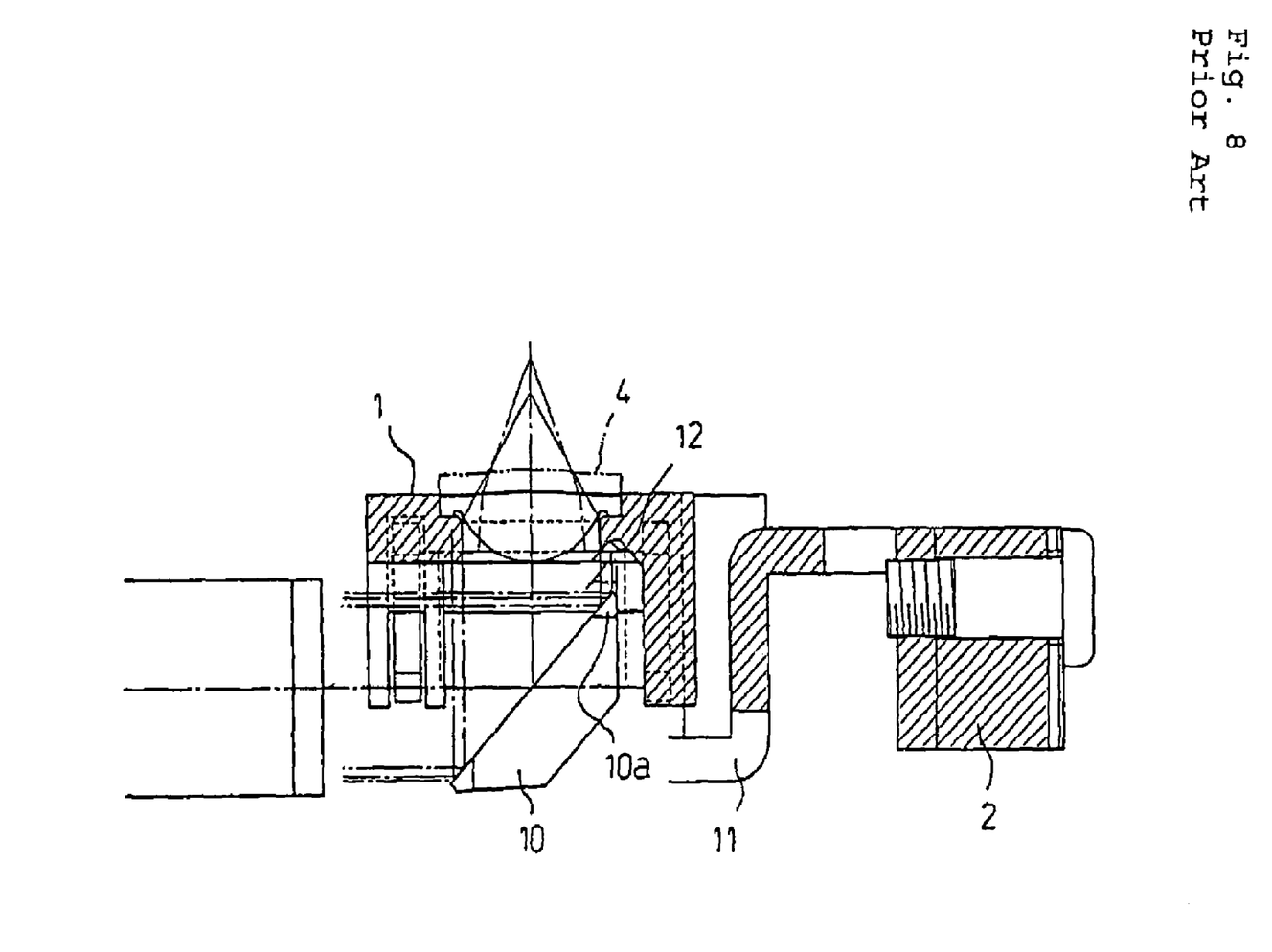
FIG. 8 is a cross-sectional view illustrating the configuration of the conventional lens holder.

Next, the lens holder 1 supported by the ends of the suspension wires 3 is formed in a box shape, as shown in FIG. 8, such that a space is formed below the objective lens. A rising mirror 10 fixed to a frame (not shown) provided below the yoke base is housed in the space. In order to locate the rising mirror 10 at a high position in the space, a clearance groove 12 is formed in the inner wall of the lens holder 1, and thus the top 10a of the rising mirror 10 can be inserted into the clearance groove 12. As a result, even if the lens holder 1 goes down by means of a focus servo, the distance can be secured by the clearance groove 12, and thus the rising mirror 10 can be located at a relatively higher position, thereby contributing to the reduction of the entire thickness of the optical pickup device (for example, see Patent Document 1).

In order to prevent the lens holder and the rising mirror from contacting with each other, it may be considered that the focal length of the objective lens is increased. However, it becomes physically difficult to control the lens holder when the focal length is increased, because the objective lens and the optical disk may come into contact with each other. On the other hand, when the focal length is decreased, the size of the objective lens is reduced, so that the shape of the lens may be easily deformed. Accordingly, an aberration may occur and thus cause deterioration of the beam spot shape or deterioration of utilization efficiency of the light beam, thereby causing deterioration of the function of the optical pickup device.

As another method for preventing the lens holder and the rising mirror from contacting with each other, it may be considered that the height of the rising mirror is reduced. However, in this case, the margin of the light-receiving surface of the rising mirror cannot be obtained sufficiently, and thus the laser beam guided to the optical disk and the laser beam reflected and diffracted from the optical disk can be lost, thereby deteriorating signal quality.

[Patent Document 1]

Japanese Patent Application No. 2001-303990

In the conventional lens holder, as described above, a clearance groove is formed at a position corresponding to the top of the rising mirror. However, since the thickness of the clearance groove portion is decreased in the lens holder integrally formed of synthetic resin, the resin supply in shaping is not uniform, and the shape is disturbed, so that the shaping accuracy cannot be kept constant.

As a result of trial and error, the present applicant has suggested that a cut-out portion obtained by removing the clearance groove portion be provided, but in this case, the peripheral light of the laser beam leaks through the cut-out portion, thereby causing a problem in that an accurate beam spot cannot be formed.

SUMMARY OF THE INVENTION

The present invention is designed to solve the aforementioned problem, and thus an object of the present invention is to provide an optical pickup device with high reliability and reduced thickness, the optical pickup device being capable of forming an accurate beam spot without providing a thin film section causing difficulty in forming a lens holder.

Therefore, in order to accomplish the above object, the present invention provides the following means. That is, there is provided an optical pickup device for driving and controlling a lens holder holding an objective lens by using a moving coil method, and for adjusting the irradiation position of a laser beam on an optical disk by displacing the objective lens, wherein a cut-out portion is formed at a position closest to the rising mirror on an opening which is formed in the lens holder for holding the objective lens, and a light-shielding ring for sealing the cut-out portion is arranged to fix the objective lens.

BRIEF DESCRIPTION OF THE DRAWINGS

The above and other features and advantages of the present invention will become more apparent from detailed description of exemplary embodiments thereof with reference to the accompanying drawings in which.

DESCRIPTION OF THE PREFERRED EMBODIMENT

Now, preferred embodiments of the present invention will be described in detail with reference to the accompanying drawings.

In the embodiment, elements similar to the conventional construction are denoted by like reference numerals, and description thereof will be omitted.

Figure 1:
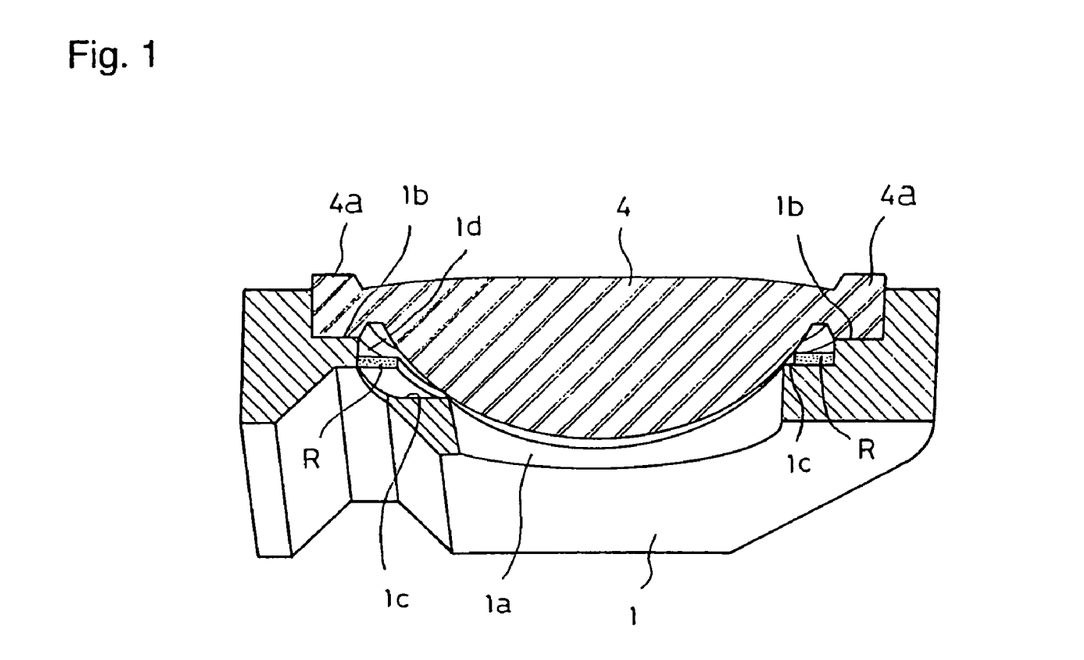
FIG. 1 is a perspective view illustrating the configuration of a lens holder according to the present invention.
Figure 2:
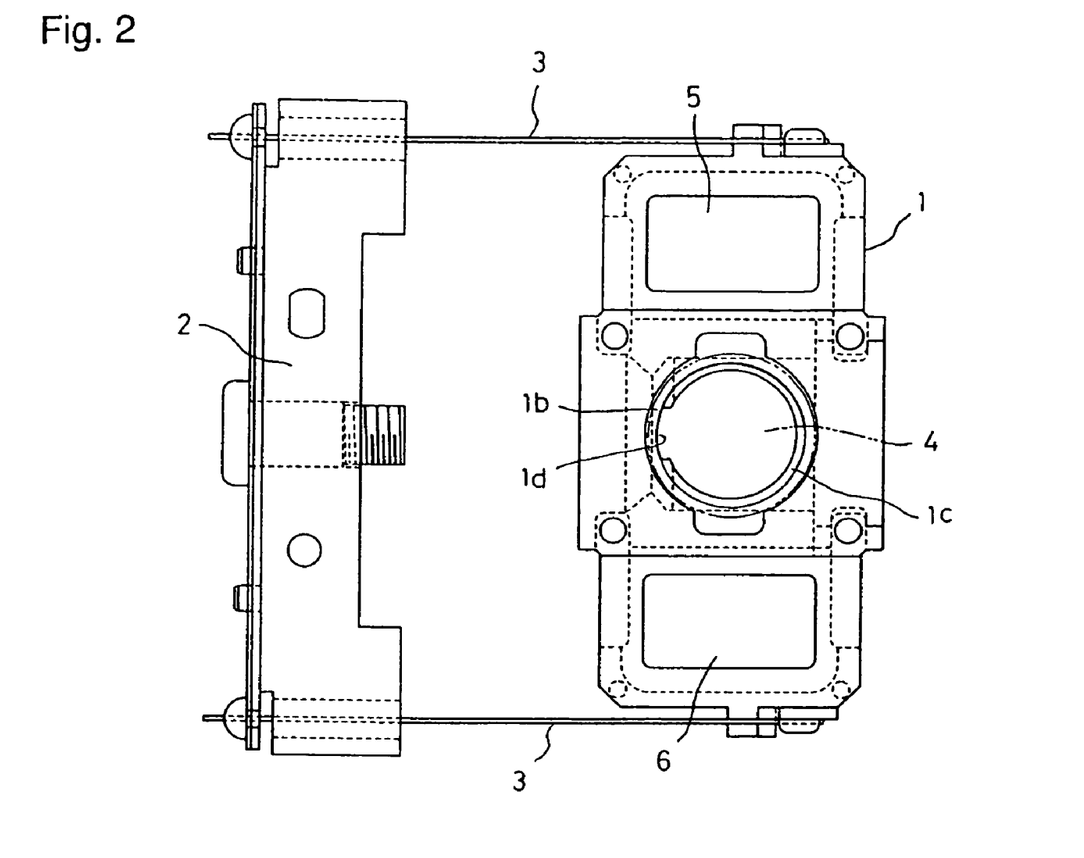
FIG. 2 is a plan view illustrating the configuration of the lens holder according to the present invention.

FIG. 1 is a cross-sectional perspective view illustrating the configuration of a lens holder 1 according to the present invention, where an objective lens 4 is attached thereto. A stepped portion 1b for fitting a circumferential flange portion 4a of the objective lens 4 is formed in an outer circumferential portion of an opening 1a of the lens holder 1, and a stepped portion 1c having a diameter smaller than that of the stepped portion 1b is also formed therein. Furthermore, a cut-out portion 1d is formed at a position closest to the top 10a of a rising mirror 10 such as reflecting mirror, reflecting prism and right-angle prism in the stepped portion 1c in a state shown in FIG. 2.

Figure 3:
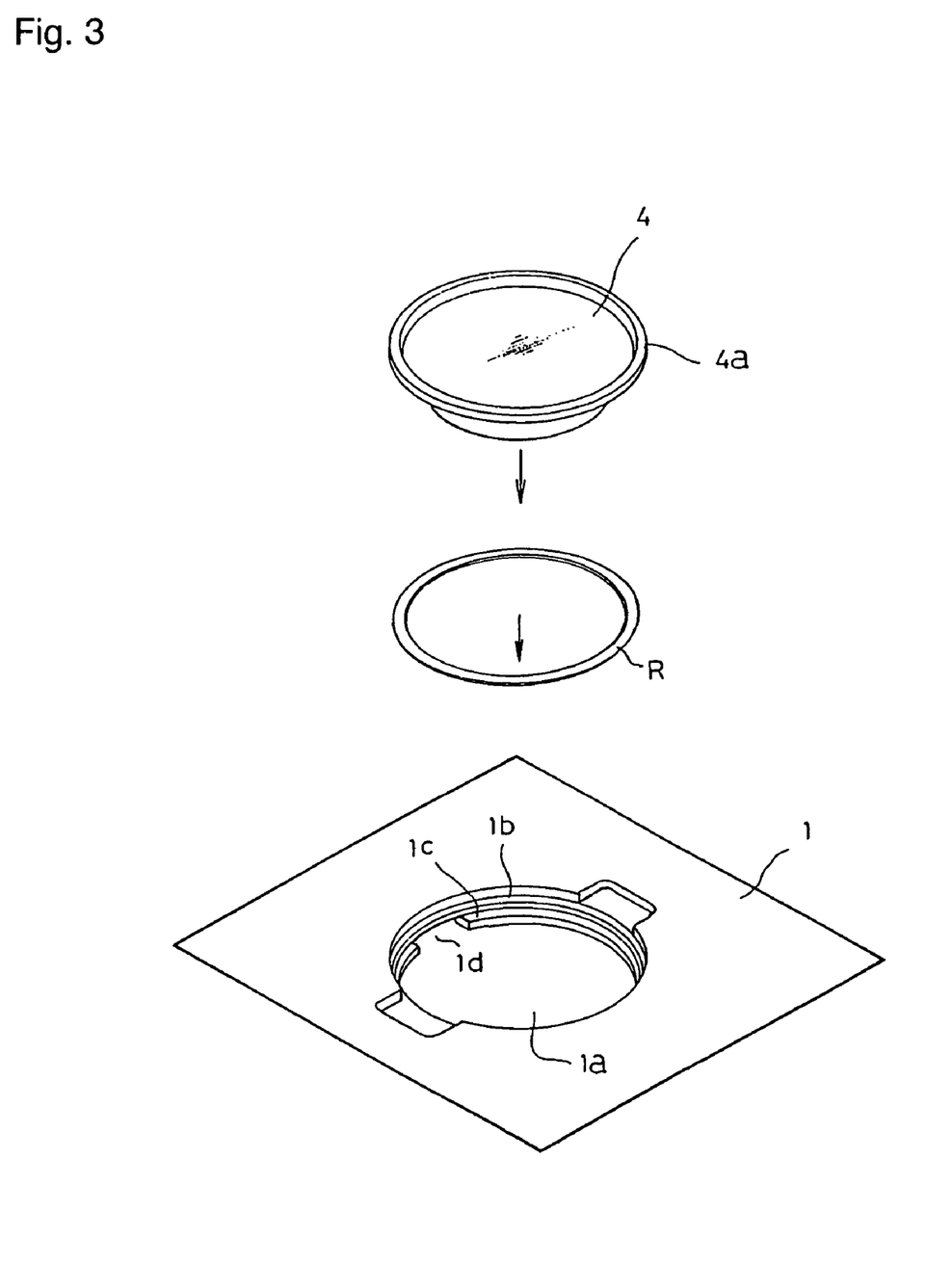
FIG. 3 is a perspective view illustrating a state where the lens holder according to the present invention is assembled.

When the objective lens 4 is assembled and fixed to the lens holder 1 formed in this way, first, a light-shielding ring R having a very small thickness is mounted on the stepped portion 1c. The light-shielding ring R is not particularly limited to metal, as long as it can prevent the laser beam from passing, but it is preferable that it be formed of a material suitable for processing a thin film. As shown in FIG. 3, after the light-shielding ring R is mounted, the flange portion 4a of the objective lens 4 is fitted to the stepped portion 1b and is then fixed thereto by using proper means, such as an adhesive. According to the aforementioned construction, since the cut-out portion of the lens holder is sealed with the light-shielding ring and thus the peripheral light of a laser beam can be completely blocked, it is possible to form an accurate beam spot without influencing the peripheral light. As a result, it is possible to implement an optical pickup device with high reliability and reduced thickness while avoiding the formation of a thin film portion in the lens holder.

What is claimed is:

1. An optical pickup device for driving and controlling a lens holder holding an objective lens by using a moving coil method, and for adjusting an irradiation position of a laser beam on an optical disk by displacing the objective lens, the device comprising:

a lens holder for holding the objective lens, an opening formed in the lens holder;

a stepped portion formed in an outer circumferential portion of the opening;

a cut-out portion formed in the stepped portion closest to a rising mirror; and a light shielding ring arranged on the stepped portion to seal the cut-out portion.

* * * * *